US009787949B2

(12) United States Patent
Kim

(10) Patent No.: US 9,787,949 B2
(45) Date of Patent: Oct. 10, 2017

(54) APPARATUS TO RECOGNIZE ILLUMINATION ENVIRONMENT OF VEHICLE AND CONTROL METHOD THEREOF

(71) Applicant: MANDO CORPORATION, Pyeongtaek-si, Gyeonggi-do (KR)

(72) Inventor: Myung-Woo Kim, Seongnam-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 674 days.

(21) Appl. No.: 14/177,448

(22) Filed: Feb. 11, 2014

(65) Prior Publication Data

US 2014/0232854 A1   Aug. 21, 2014

(30) Foreign Application Priority Data

Feb. 18, 2013  (KR) .................. 10-2013-0016746

(51) Int. Cl.
*H04N 7/18*   (2006.01)
*G06K 9/46*   (2006.01)
(Continued)

(52) U.S. Cl.
CPC ......... *H04N 7/183* (2013.01); *G06K 9/00791* (2013.01); *G06K 9/4661* (2013.01); *G06K 9/6223* (2013.01); *B60Q 2300/314* (2013.01)

(58) Field of Classification Search
CPC .. H04N 7/183; G06K 9/00791; G06K 9/6223; G06K 9/4661; B60C 2300/314
(Continued)

(56) References Cited

U.S. PATENT DOCUMENTS

| 7,566,851 B2* | 7/2009 | Stein | ............. B60Q 1/143 250/205 |
| 2010/0172542 A1* | 7/2010 | Stein | ............. G06K 9/00798 382/103 |

(Continued)

FOREIGN PATENT DOCUMENTS

| JP | H10-44860 A | 2/1998 |
| JP | 2005-167842 A | 6/2005 |

(Continued)

OTHER PUBLICATIONS

Notification of Reason for Refusal for Japanese Application No. 2014-021724 dated Jan. 20, 2015.

*Primary Examiner* — Mohammed Rahaman
*Assistant Examiner* — Richard Carter
(74) *Attorney, Agent, or Firm* — Hauptman Ham, LLP

(57) ABSTRACT

Disclosed herein are an apparatus to recognize an illumination environment of a vehicle and a control method thereof. The apparatus includes an infrared illumination sensor to detect an infrared illumination amount emitted from the sun, a camera, and an illumination environment recognition unit which detects the infrared illumination amount by the infrared illumination sensor, receives a camera exposure time from the camera, receives double exposure images captured to have different exposure values, calculates a general illumination value based on the detected infrared illumination amount, the received camera exposure time, and an illumination value obtained through an image clustering analysis of the double exposure images, calculates a rate of change in the calculated general illumination value, and recognizes a current illumination environment as an illumination environment for each time section based on the calculated general illumination value and the rate of change in the general illumination value.

9 Claims, 6 Drawing Sheets

(51) Int. Cl.
*G06K 9/62* (2006.01)
*G06K 9/00* (2006.01)

(58) Field of Classification Search
USPC .......... 348/135, 148; 382/103; 701/2, 36, 41
See application file for complete search history.

(56) References Cited

U.S. PATENT DOCUMENTS

| | | | | |
|---|---|---|---|---|
| 2010/0231712 | A1* | 9/2010 | Suenobu | H04N 5/23219 348/135 |
| 2012/0002050 | A1* | 1/2012 | Taniguchi | H04N 7/181 348/148 |
| 2012/0026333 | A1* | 2/2012 | Okuyama | B60R 1/00 348/148 |
| 2013/0194424 | A1* | 8/2013 | Furusawa | H04N 5/235 348/148 |

FOREIGN PATENT DOCUMENTS

| | | |
|---|---|---|
| JP | 2008-42695 A | 2/2008 |
| JP | 2010-98358 A | 4/2010 |
| KR | 10-2002-0004522 A | 1/2002 |
| KR | 20-2011-0010226 U | 10/2011 |

* cited by examiner

APPARATUS TO RECOGNIZE ILLUMINATION ENVIRONMENT OF VEHICLE AND CONTROL METHOD THEREOF

CROSS-REFERENCE TO RELATED APPLICATION

This application claims the benefit of Korean Patent Application No. 2013-0016746, filed on Feb. 18, 2013 in the Korean Intellectual Property Office, the disclosure of which is incorporated herein by reference.

BACKGROUND

1. Field

Embodiments of the present invention relate to an apparatus to recognize an illumination environment of a vehicle and a control method thereof, which may allow a current illumination environment of a vehicle to be accurately recognized.

2. Description of the Related Art

Conventionally, there is used a method of recognizing an illumination environment by an illumination sensor to turn a headlight on/off or adjust intensity of the headlight according to the recognized illumination environment.

However, when an illumination environment is recognized by only an illumination sensor in a shaded region of mountains in the daytime or on a cloudy day, the illumination environment may be erroneously recognized as nighttime despite daytime. As a result, headlight control may be unnecessarily performed.

In addition, there is a method of recognizing an illumination environment by capturing a front image using a camera and then analyzing the captured image. In this case, however, an illumination environment of a vehicle may be erroneously recognized because the method relies on the image analysis and may be affected by an object or a background color.

Accordingly, the related art is problematic in that it is difficult to grasp various illumination environments of the vehicle merely by the illumination sensor or the camera.

SUMMARY

Therefore, it is an aspect of the present invention to provide an apparatus to recognize an illumination environment of a vehicle and a control method thereof, which may allow various illumination environments of a vehicle to be recognized using an infrared illumination amount and a camera exposure time.

It is another aspect of the present invention to provide an apparatus to recognize an illumination environment of a vehicle and a control method thereof, which may allow various illumination environments of a vehicle to be recognized using an illumination value obtained through an image clustering analysis of a plurality of images having different exposure values, together with an infrared illumination amount and a camera exposure time.

Additional aspects of the invention will be set forth in part in the description which follows and, in part, will be obvious from the description, or may be learned by practice of the invention.

In accordance with one aspect of the present invention, an apparatus to recognize an illumination environment of a vehicle includes an infrared illumination sensor to detect an infrared illumination amount emitted from the sun, a camera to capture a road on which a vehicle drives, and an illumination environment recognition unit which detects the infrared illumination amount by the infrared illumination sensor, receives a camera exposure time from the camera, receives double exposure images captured to have different exposure values by adjusting the exposure values of the camera, calculates a general illumination value based on the detected infrared illumination amount, the received camera exposure time, and an illumination value obtained through an image clustering analysis of the double exposure images, calculates a rate of change in the calculated general illumination value, and recognizes a current illumination environment as an illumination environment for each time section based on the calculated general illumination value and the rate of change in the general illumination value.

When, in the illumination environment recognition unit, "A" represents an infrared illumination value, "B" represents an illumination value corresponding to the camera exposure time, and "C" represents an illumination value corresponding to the result value obtained through the clustering analysis of the double exposure images, the general illumination value may be obtained by the following equation:

general illumination value=$W1 \times A + W2 \times B + W3 \times C$, where W1, W2, and W3 refer to weights, and the weights W1 to W3 have a relation of W1>W2>W3.

The illumination environment recognition unit may determine the current illumination environment to be any one of daytime, nighttime, twilight, and dawn.

When the general illumination value is equal to or more than a preset illumination value and the rate of change in the general illumination value is less than a preset rate of change, the illumination environment recognition unit may determine the current illumination environment to be daytime, when the general illumination value is less than a preset illumination value and the rate of change in the general illumination value is less than a preset rate of change, the illumination environment recognition unit may determine the current illumination environment to be nighttime, when the general illumination value gradually decreases and the rate of change in the general illumination value is equal to or more than a preset rate of change, the illumination environment recognition unit may determine the illumination environment to be twilight, and when the general illumination value gradually increases and the rate of change in the general illumination value is equal to or more than a preset rate of change, the illumination environment recognition unit may determine the illumination environment to be dawn.

When the general illumination value rapidly decreases for a short time period, the illumination environment recognition unit may determine the current illumination environment as entry into a tunnel.

In accordance with another aspect of the present invention, an apparatus to recognize an illumination environment of a vehicle includes an infrared illumination sensor to detect an infrared illumination amount emitted from the sun, a camera to capture a road on which a vehicle drives, and an illumination environment recognition unit which detects the infrared illumination amount by the infrared illumination sensor, receives a camera exposure time from the camera, calculates a general illumination value based on the detected infrared illumination amount and the received camera exposure time, calculates a rate of change in the calculated general illumination value, and recognizes a current illumination environment as at least one of daytime, nighttime, twilight, and dawn based on the rate of change in the calculated general illumination value, wherein when the general illumination value is equal to or more than a preset illumination value and the rate of change in the general illumination value is less than a preset rate of change, the illumination environment recognition unit determines the current illumination environment to be daytime, when the general illumination value is less than a preset illumination value and the rate of change in the general illumination value is less than a preset rate of change, the illumination environment recognition unit determines the current illumination environment to be nighttime, when the general illumination value gradually decreases and the rate of change in the general illumination value is equal to or more than a preset rate of change, the illumination environment recognition unit determines the illumination environment to be twilight, and when the general illumination value gradually increases and the rate of change in the general illumination value is equal to or more than a preset rate of change, the illumination environment recognition unit determines the illumination environment to be dawn.

In accordance with a further aspect of the present invention, a method of recognizing an illumination environment of a vehicle includes detecting an infrared illumination amount by an infrared illumination sensor to detect an infrared illumination amount emitted from the sun, receiving a camera exposure time from a camera to capture a road on which a vehicle drives, receiving double exposure images captured to have different exposure values by adjusting the exposure values of the camera, calculating a general illumination value based on the detected infrared illumination amount, the received camera exposure time, and an illumination value obtained through an image clustering analysis of the double exposure images, calculating a rate of change in the calculated general illumination value, and recognizing a current illumination environment as an illumination environment for each time section based on the calculated general illumination value and the rate of change in the general illumination value.

When, in the calculating a general illumination value, "A" represents an infrared illumination value, "B" represents an illumination value corresponding to the camera exposure time, and "C" represents an illumination value corresponding to the result value obtained through the clustering analysis of the double exposure images, the general illumination value may be obtained by the following equation:

general illumination value=$W1 \times A + W2 \times B + W3 \times C$, where W1, W2, and W3 refer to weights, and the weights W1 to W3 have a relation of W1>W2>W3.

The recognizing an illumination environment may determine the current illumination environment to be any one of daytime, nighttime, twilight, and dawn.

When the general illumination value is equal to or more than a preset illumination value and the rate of change in the general illumination value is less than a preset rate of change, the current illumination environment may be determined to be daytime, when the general illumination value is less than a preset illumination value and the rate of change in the general illumination value is less than a preset rate of change, the current illumination environment may be determined to be nighttime, when the general illumination value gradually decreases and the rate of change in the general illumination value is equal to or more than a preset rate of change, the illumination environment may be determined to be twilight, and when the general illumination value gradually increases and the rate of change in the general illumination value is equal to or more than a preset rate of change, the illumination environment may be determined to be dawn.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
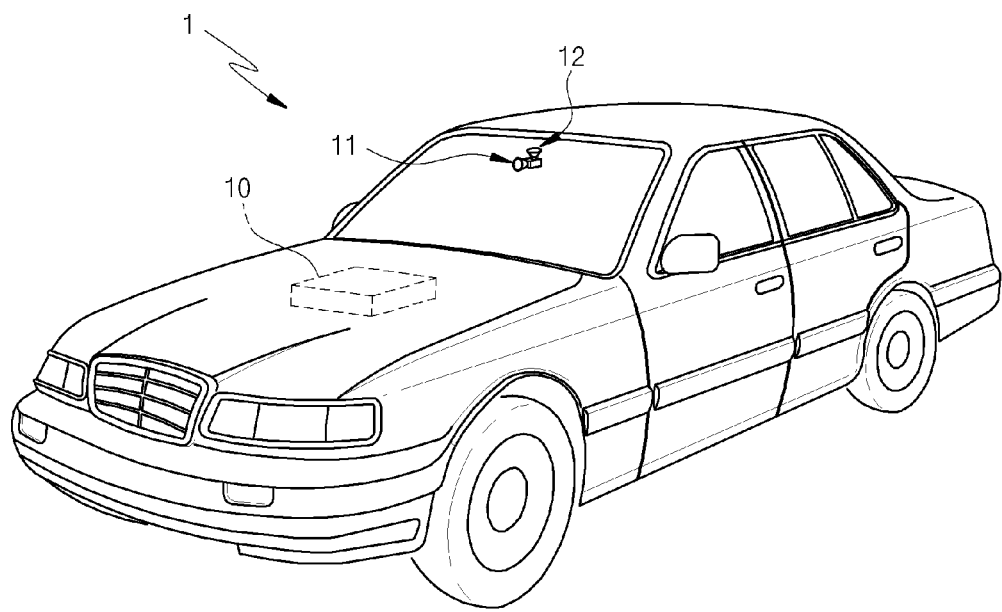
FIG. 1 is a view illustrating a configuration of a vehicle to which an apparatus to recognize an illumination environment of a vehicle according to an embodiment of the present invention is applied.

Reference will now be made in detail to the embodiments of the present invention with reference to the accompanying drawings. These embodiments are provided as examples so that the present invention will be thorough and complete, and will fully convey the scope of the invention to those skilled in the art. The present invention may be embodied in many different forms and should not be construed as limited to the embodiments set forth herein. In certain embodiments, unrelated portions may be omitted in the drawings in order to avoid obscuring appreciation of the invention by a person of ordinary skill in the art. In the drawings, the width, the length, the thickness, or the like of each component may be exaggerated, omitted, or schematically illustrated for convenience of description and clarity. Wherever possible, the same reference numbers will be used throughout the drawings to refer to the same or like parts.

In the specification, the term "and/or" is intended to include at least one of preceding and succeeding components. In addition, the term "connected/coupled" means that one component is directly connected to another component or is indirectly connected through another component. In the specification, the singular forms are intended to include the plural forms as well, unless context clearly indicates otherwise. It will be further understood that the terms "comprises" and/or "comprising," when used in the specification, specify the presence of stated features, integers, steps, operations, elements, and/or components, but do not preclude the presence or addition of one or more other features, integers, steps, operations, elements, components, and/or groups thereof.

Figure 2:
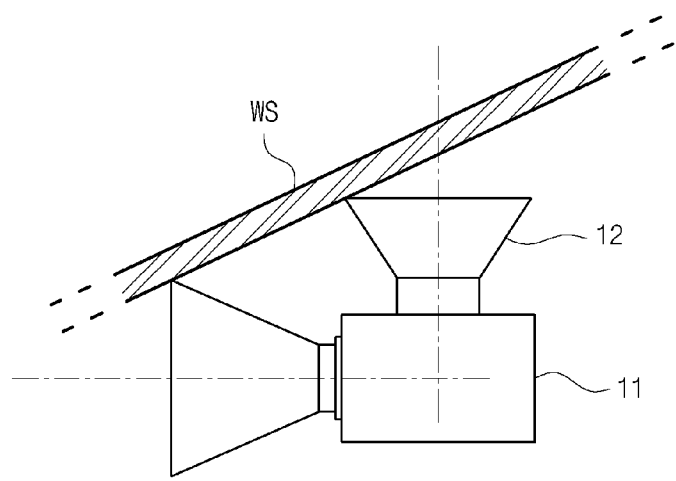
FIG. 2 is a view illustrating a configuration of a camera and an infrared illumination sensor of FIG. 1.

FIG. 1 is a view illustrating a configuration of a vehicle to which an apparatus to recognize an illumination environment of a vehicle according to an embodiment of the present invention is applied. FIG. 2 is a view illustrating a configuration of a camera and an infrared illumination sensor of FIG. 1.

Referring to FIGS. 1 and 2, an apparatus to recognize an illumination environment of a vehicle 10 may be configured by an ECU mounted in a vehicle 1.

The apparatus to recognize an illumination environment of a vehicle 10 includes a camera 11 such as a CCD camera or a CMOS color image sensor, and an infrared illumination sensor 12.

The camera 11 has a capture range delimited as the front side in the proceeding direction of the vehicle 1, and captures an image including a road ahead of the vehicle 1.

The camera 11 is located on a centerline of a windshield WS of the vehicle 1.

The infrared illumination sensor 12 is disposed on the windshield WS of the vehicle 1 so as to be directed upward toward the air. For example, the infrared illumination sensor 12 may be disposed on the windshield in parallel with the vertical direction of the vehicle.

The infrared illumination sensor 12 detects an infrared illumination amount emitted from the sun.

An approximately half of light emitted from the sun is infrared light and the remainder is mainly visible light. The infrared illumination sensor 12 detects an infrared illumination amount emitted from the sun.

Figure 3:
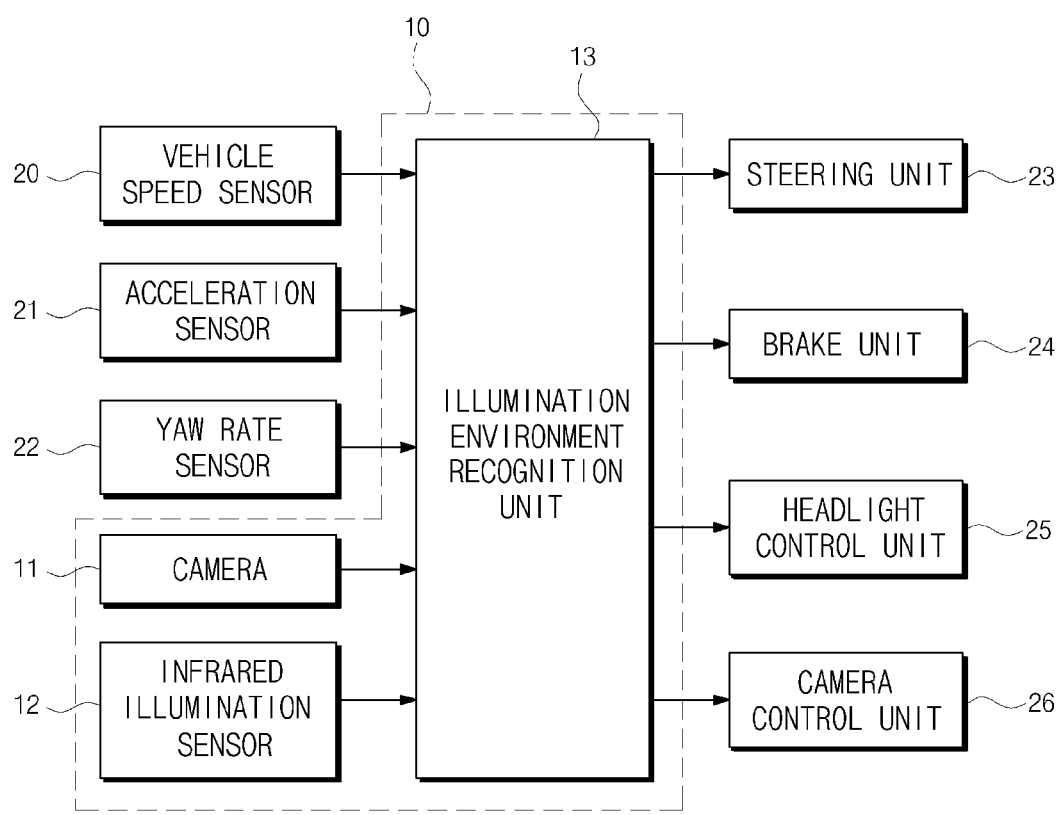
FIG. 3 is a control block diagram of the apparatus to recognize an illumination environment of a vehicle according to the embodiment of the present invention.

As shown in FIG. 3, the vehicle 1 includes a vehicle speed sensor 20, an acceleration sensor 21, a yaw rate sensor 22, a steering unit 23, a brake unit 24, a headlight control unit 25, a camera control unit 26, etc.

The vehicle speed sensor 20, the acceleration sensor 21, and the yaw rate sensor 22 output signals corresponding to speed, acceleration, and yaw rate of the vehicle 1, respectively.

The steering unit 23 is configured such that front wheel/rear wheel steering gears driven by operation of a handle are driven by an actuator.

The brake unit 24 allows the vehicle to brake.

The headlight control unit 25 performs a function such as power on/off of a headlight or adjustment of direction/brightness thereof.

The camera control unit 26 automatically adjusts set values such as a lens ISO value, an aperture value, a white balance value, and a shutter speed value of the camera 11.

An illumination environment recognition unit 13 of the apparatus to recognize an illumination environment of a vehicle 10 recognizes an illumination environment of the vehicle based on signals output from the camera 11 and the infrared illumination sensor 12 and controls at least one of the steering unit 23, the brake unit 24, the headlight control unit 25, and the camera control unit 26 based on the recognized illumination environment, thereby performing control of the vehicle depending upon the illumination environment.

The illumination environment recognition unit 13 divides an illumination environment according to time sections such as daytime, nighttime, a time section from daytime to nighttime (twilight), and a time section from nighttime to daytime (dawn) to recognize the divided illumination environment.

In addition, the illumination environment recognition unit 13 divides an illumination environment according to geographic features to recognize the divided illumination environment.

Hereinafter, a description will be given that the illumination environment recognition unit 13 divides an illumination environment according to time sections such as daytime, nighttime, twilight, and dawn to recognize the divided illumination environment.

The illumination environment recognition unit 13 may calculate a general illumination value based on an infrared illumination amount sensed by the infrared illumination sensor 12 and a camera exposure time received from the camera 11, calculate a rate of change in the general illumination value for a preset time period, and determine whether a current illumination environment is daytime, nighttime, twilight, or dawn based on the calculated general illumination value and the rate of change in the general illumination value.

Figure 4:
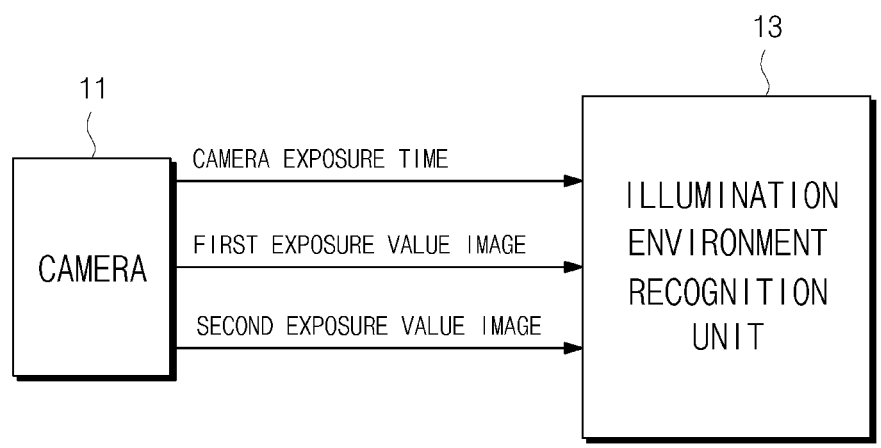
FIG. 4 is a diagram for explanation of information received from the camera by an illumination environment recognition unit of the apparatus to recognize an illumination environment of a vehicle according to the embodiment of the present invention.

In addition, as shown in FIG. 4, the illumination environment recognition unit 13 may calculate a general illumination value based on an illumination value obtained through an image clustering analysis of two images captured with different exposure values by the camera 11, together with an infrared illumination amount sensed by the infrared illumination sensor 12 and a camera exposure time received from the camera 11, and determine whether a current illumination environment is daytime, nighttime, twilight, or dawn based on the calculated general illumination value and a rate of change in the general illumination value.

In this case, when "A" represents an infrared illumination value, "B" represents an illumination value corresponding to the camera exposure time, and "C" represents an illumination value corresponding to the result value obtained through an image clustering analysis of two images captured with different exposure values, a general illumination value may be obtained by the following equation.

$$\text{General illumination value} = W1 \times A + W2 \times B + W3 \times C,$$

where W1, W2, and W3 refer to weights.

The weights W1 to W3 have a relation of W1>W2>W3. In this case, the weight W1 of the infrared illumination value may be set as a relatively larger value than a value summing the other weights W2 and W3. Thereby, the infrared illumination value A may be used as a main value for recognition of an illumination environment and the remaining illumination values B and C may be accessorily used.

The camera exposure value is a value formed by a proper combination of an aperture and a shutter of the camera 11 and refers to a time for which a CCD element or a CMOS element is exposed to light and an amount by which the same is received from light.

The time exposed to light corresponds to a shutter speed value and the amount of light corresponds to an aperture value. The exposure value is decided by summing the two values.

In a case of suddenly moving from the dark to the light or vise versa, humans may not visually distinguish an object in a moment, but may visually distinguish an object after a certain time elapses.

This is enabled by motion of the iris in the human eye. If an amount of light is large, the amount of light decreases while the pupil is closed by motion of the iris, thereby allowing an amount of light incident upon the eyeball to decrease. If an amount of light is small, the amount of light increases while the pupil is opened by motion of the iris, thereby allowing an amount of light incident upon the eyeball to increase. The iris adjusts an opening degree of the pupil by sensing a level of light, enabling an amount of light to be flexibly adjusted.

The camera adjusts exposure by opening the aperture to increase an incident amount of light as approaching a low illumination state and by closing the aperture to decrease an incident amount of light as approaching a high illumination state, and the exposure value is decided by an aperture value and a shutter speed value.

In the camera, a proper exposure value may be automatically decided and received from the camera.

A brighter image may be obtained as the exposure value is higher, whereas a darker image may be obtained as the exposure value is lower. Thus, when the exposure value is changed, it may be possible to obtain images having brightness different from each other.

Figure 5:
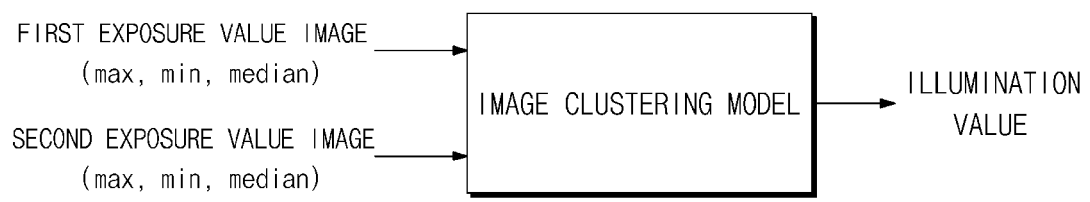
FIG. 5 is a diagram for explanation that the illumination environment recognition unit of the apparatus to recognize an illumination environment of a vehicle according to the embodiment of the present invention obtains an illumination value by applying an image clustering model to double exposure images.

As shown in FIG. 5, the illumination environment recognition unit 13 acquires two images captured with different exposure values by the camera 11 and then acquires an illumination value obtained through an image clustering analysis of the acquired two double exposure images.

In this case, the two double exposure images are two images obtained using a first exposure value for acquisition of an optimal road image and a second exposure value for acquisition of a darker road image than the optimal road image.

To this end, in a state in which the first and second exposure values are respectively preset and stored in a storage portion, a first image when the camera exposure value obtained from the camera is the first exposure value and a second image when the camera exposure value obtained from the camera is the second exposure value are acquired.

In the image clustering analysis of the double exposure images, each of two images is first obtained as a maximum value, a minimum value, and a median value according to brightness thereof, the obtained respective values are input, and an illumination value corresponding to a change in illumination is obtained using a clustering model having a predefined illumination space.

The image clustering method used in the embodiment of the present invention is a well-known method, which is disclosed in a document of David Acunzo et al: "Context-Adaptive Approach for Vehicle Detection Under Varying Lighting Conditions" published on Sep. 30, 2007 announce at the IEEE Intelligent Transportation Systems Conference.

When a general illumination value is calculated, the illumination environment recognition unit 13 determines whether a current illumination environment is daytime, nighttime, twilight, or dawn based on a rate of change in the calculated general illumination value.

When the general illumination value is equal to or more than a preset illumination value and the rate of change in the general illumination value is less than a preset rate of change, the illumination environment recognition unit 13 determines the illumination environment to be daytime.

In addition, when the general illumination value is less than a preset illumination value and the rate of change in the general illumination value is less than a preset rate of change, the illumination environment recognition unit 13 determines the illumination environment to be nighttime.

In addition, when the general illumination value gradually decreases and the rate of change in the general illumination value is equal to or more than a preset rate of change, the illumination environment recognition unit 13 determines the illumination environment to be twilight.

In addition, when the general illumination value gradually increases and the rate of change in the general illumination value is equal to or more than a preset rate of change, the illumination environment recognition unit 13 determines the illumination environment to be dawn.

In addition, when the general illumination value rapidly decreases for a short time period, the illumination environment recognition unit 13 determines the illumination environment as entry into a tunnel.

Figure 6:
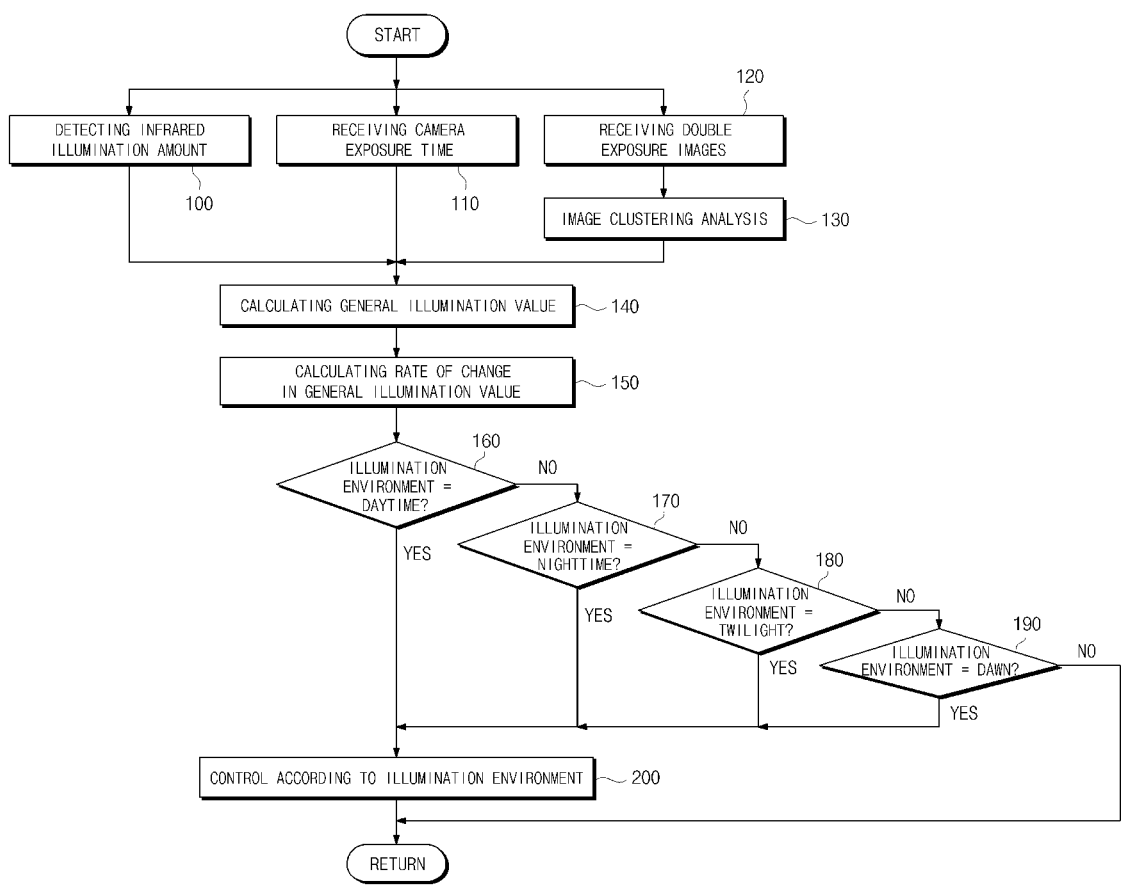
FIG. 6 is a control flowchart illustrating a method of recognizing an illumination environment of a vehicle according to an embodiment of the present invention.

FIG. 6 is a control flowchart illustrating a method of recognizing an illumination environment of a vehicle according to an embodiment of the present invention.

Referring to FIG. 6, the illumination environment recognition unit 13 detects an infrared illumination amount emitted from the sun through the infrared illumination sensor 12 (operation mode 100) and receives a camera exposure time from the camera 11 (operation mode 110).

In addition, the illumination environment recognition unit 13 receives double exposure images which are two images captured with different exposure values by the camera 11 (operation mode 120). Then, the illumination environment recognition unit 13 performs an image clustering analysis upon the received double exposure images so as to acquire an illumination value (operation mode 130). Here, the illumination value is determined depending on that a group, in which factors such as a maximum value, a minimum value, and a median value among brightness values of the exposure image are scattered into a predefined illumination space in an image clustering model and the scattered factors are gathered, belongs to which of illumination groups.

Then, the illumination environment recognition unit 13 calculates a general illumination value based on the infrared illumination amount, the camera exposure time, and the illumination value obtained through the image clustering analysis of the double exposure images, which are obtained at operation modes 100 to 130 (operation mode 140).

After the general illumination value is calculated, the illumination environment recognition unit 13 calculates a rate of change in the general illumination value for a preset time period (operation mode 150).

Then, the illumination environment recognition unit 13 determines whether a current illumination environment is daytime, nighttime, twilight, or dawn based on the general illumination value and the rate of change in the general illumination value.

The illumination environment recognition unit 13 determines whether or not the current illumination environment is daytime (operation mode 160). When the general illumination value is equal to or more than a preset illumination value and the rate of change in the general illumination value is less than a preset rate of change, the illumination environment recognition unit 13 determines the illumination environment to be daytime.

If the current illumination environment is determined to be daytime as a result of the determination of operation mode 160, the illumination environment recognition unit 13 performs control according to a daytime illumination environment. For example, the illumination environment recognition unit 13 allows the brake unit and the camera control unit to be controlled according to the daytime illumination environment (operation mode 200).

Meanwhile, if the illumination environment is not determined to be daytime as a result of the determination of operation mode 160, the illumination environment recognition unit 13 determines whether or not the current illumination environment is nighttime (operation mode 170). When the general illumination value is less than a preset illumination value and the rate of change in the general illumination value is less than a preset rate of change, the illumination environment recognition unit 13 determines the illumination environment to be nighttime.

If the current illumination environment is determined to be nighttime as a result of the determination of operation mode 170, the illumination environment recognition unit 13 performs control according to a nighttime illumination environment (operation mode 200).

Meanwhile, if the illumination environment is not determined to be nighttime as a result of the determination of operation mode 170, the illumination environment recognition unit 13 determines whether or not the current illumination environment is twilight (operation mode 180). When the general illumination value gradually decreases and the rate of change in the general illumination value is equal to or more than a preset rate of change, the illumination environment recognition unit 13 determines the illumination environment to be twilight.

If the current illumination environment is determined to be twilight as a result of the determination of operation mode 180, the illumination environment recognition unit 13 performs control according to a twilight illumination environment (operation mode 200).

Meanwhile, if the illumination environment is not determined to be twilight as a result of the determination of operation mode 180, the illumination environment recognition unit 13 determines whether or not the current illumination environment is dawn (operation mode 190). When the general illumination value gradually increases and the rate of change in the general illumination value is equal to or more than a preset rate of change, the illumination environment recognition unit 13 determines the illumination environment to be dawn.

If the current illumination environment is determined to be dawn as a result of the determination of operation mode 190, the illumination environment recognition unit 13 performs control according to a dawn illumination environment (operation mode 200).

As is apparent from the above description, an apparatus to recognize an illumination environment of a vehicle and a control method thereof according to embodiments of the present invention may allow various illumination environments of a vehicle to be recognized using an infrared illumination amount, a camera exposure time, and a plurality of images having different exposure values, enabling daytime and nighttime to be accurately and reliably recognized. In addition, it may be possible to accurately and reliably recognize a change in the illumination environment from nighttime to dawn, a change in the illumination environment from daytime to twilight, and a change in the illumination state such as entry into a tunnel. Therefore, a driver support system for control of a headlight or a camera may be effectively controlled according to environmental conditions of the vehicle.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus to recognize an illumination environment of a vehicle, comprising:
an infrared illumination sensor to detect an infrared illumination amount emitted from the sun;
a camera to capture a road on which a vehicle drives; and
an illumination environment recognition unit which detects the infrared illumination amount by the infrared illumination sensor, receives a camera exposure time from the camera, receives double exposure images captured to have different exposure values by adjusting the exposure values of the camera, calculates a general illumination value based on the detected infrared illumination amount, the received camera exposure time, and an illumination value obtained through an image clustering analysis of the double exposure images, calculates a rate of change in the calculated general illumination value, and recognizes a current illumination environment as an illumination environment for each time section based on the calculated general illumination value and the rate of change in the general illumination value.

2. The apparatus according to claim 1, wherein when, in the illumination environment recognition unit, "A" represents an infrared illumination value, "B" represents an illumination value corresponding to the camera exposure time, and "C" represents an illumination value corresponding to the result value obtained through the clustering analysis of the double exposure images, the general illumination value is obtained by the following equation:

$$\text{general illumination value} = W1 \times A + W2 \times B + W3 \times C,$$

where W1, W2, and W3 refer to weights, and the weights W1 to W3 have a relation of W1>W2>W3.

3. The apparatus according to claim 1 or 2, wherein the illumination environment recognition unit determines the current illumination environment to be any one of daytime, nighttime, twilight, and dawn.

4. The apparatus according to claim 3, wherein:
when the general illumination value is equal to or more than a preset illumination value and the rate of change in the general illumination value is less than a preset rate of change, the illumination environment recognition unit determines the current illumination environment to be daytime;
when the general illumination value is less than a preset illumination value and the rate of change in the general illumination value is less than a preset rate of change, the illumination environment recognition unit determines the current illumination environment to be nighttime;
when the general illumination value gradually decreases and the rate of change in the general illumination value is equal to or more than a preset rate of change, the illumination environment recognition unit determines the illumination environment to be twilight; and
when the general illumination value gradually increases and the rate of change in the general illumination value is equal to or more than a preset rate of change, the illumination environment recognition unit determines the illumination environment to be dawn.

5. The apparatus according to claim 1, wherein when the general illumination value rapidly decreases for a short time period, the illumination environment recognition unit determines the current illumination environment as entry into a tunnel.

6. A method of recognizing an illumination environment of a vehicle, comprising:
detecting an infrared illumination amount by an infrared illumination sensor to detect an infrared illumination amount emitted from the sun;
receiving a camera exposure time from a camera to capture a road on which a vehicle drives;

receiving double exposure images captured to have different exposure values by adjusting the exposure values of the camera;

calculating a general illumination value based on the detected infrared illumination amount, the received camera exposure time, and an illumination value obtained through an image clustering analysis of the double exposure images;

calculating a rate of change in the calculated general illumination value; and recognizing a current illumination environment as an illumination environment for each time section based on the calculated general illumination value and the rate of change in the general illumination value.

7. The method according to claim 6, wherein when, in the calculating a general illumination value, "A" represents an infrared illumination value, "B" represents an illumination value corresponding to the camera exposure time, and "C" represents an illumination value corresponding to the result value obtained through the clustering analysis of the double exposure images, the general illumination value is obtained by the following equation:

general illumination value=$W1 \times A + W2 \times B + W3 \times C$, where W1, W2, and W3 refer to weights, and the weights W1 to W3 have a relation of W1>W2>W3.

8. The method according to claim 7, wherein:

when the general illumination value is equal to or more than a preset illumination value and the rate of change in the general illumination value is less than a preset rate of change, the current illumination environment is determined to be daytime;

when the general illumination value is less than a preset illumination value and the rate of change in the general illumination value is less than a preset rate of change, the current illumination environment is determined to be nighttime;

when the general illumination value gradually decreases and the rate of change in the general illumination value is equal to or more than a preset rate of change, the illumination environment is determined to be twilight; and when the general illumination value gradually increases and the rate of change in the general illumination value is equal to or more than a preset rate of change, the illumination environment is determined to be dawn.

9. The method according to claim 6, wherein the recognizing an illumination environment determines the current illumination environment to be any one of daytime, nighttime, twilight, and dawn.

* * * * *